US 8,289,929 B2

United States Patent
Shousterman

(10) Patent No.: US 8,289,929 B2
(45) Date of Patent: Oct. 16, 2012

(54) METHOD AND APPARATUS FOR ENABLING MOBILITY IN MOBILE IP BASED WIRELESS COMMUNICATION SYSTEMS

(75) Inventor: Leonid Shousterman, Herzlia (IL)

(73) Assignee: Alvarion Ltd., Tel-Aviv (IL)

( * ) Notice: Subject to any disclaimer, the term of this patent is extended or adjusted under 35 U.S.C. 154(b) by 0 days.

(21) Appl. No.: 13/016,790

(22) Filed: Jan. 28, 2011

(65) Prior Publication Data
US 2011/0138448 A1 Jun. 9, 2011

Related U.S. Application Data

(63) Continuation of application No. 11/175,384, filed on Jul. 7, 2005, now Pat. No. 7,881,262.

(51) Int. Cl.
H04W 4/00 (2009.01)
H04W 36/00 (2009.01)
H04K 1/00 (2006.01)
(52) U.S. Cl. ......... 370/331; 455/436; 380/270; 380/272
(58) Field of Classification Search .......... 370/331–334; 455/436–444; 380/270, 272
See application file for complete search history.

(56) References Cited

U.S. PATENT DOCUMENTS

| | | |
|---|---|---|
| 6,466,964 B1 | 10/2002 | Leung et al. |
| 6,501,746 B1 | 12/2002 | Leung |
| 6,621,810 B1 | 9/2003 | Leung |
| 6,636,498 B1 | 10/2003 | Leung |
| 6,760,444 B1 | 7/2004 | Leung |
| 6,795,857 B1 | 9/2004 | Leung et al. |
| 2003/0091011 A1 | 5/2003 | Roberts et al. |
| 2003/0092444 A1 | 5/2003 | Sengodan et al. |
| 2004/0018841 A1 | 1/2004 | Trossen |
| 2004/0097217 A1 | 5/2004 | McClain |
| 2004/0166861 A1 | 8/2004 | Trossen |
| 2004/0202126 A1 | 10/2004 | Leung et al. |
| 2005/0025091 A1 | 2/2005 | Patel et al. |
| 2005/0058099 A1* | 3/2005 | Hernandez-Mondragon et al. ............... 370/331 |
| 2005/0163078 A1* | 7/2005 | Oba et al. ................ 370/331 |
| 2006/0087999 A1 | 4/2006 | Gustave et al. |

FOREIGN PATENT DOCUMENTS

| | | |
|---|---|---|
| EP | 1 531 645 A1 | 5/2005 |
| WO | 2004/098143 A1 | 11/2004 |
| WO | 2004/112349 A1 | 12/2004 |

OTHER PUBLICATIONS

C. Perkins, Ed., "IP Mobility Support for IPv4", IETF, Request for Comments #3344, pp. 1-99, Aug. 2002.
S. Glass et al., "Mobile IP Authentication, Authorization, and Accounting Requirements", IETF, Request for Comments #2977, pp. 1-27, Oct. 2000.

* cited by examiner

*Primary Examiner* — Ricky Ngo
*Assistant Examiner* — Paul H Masur
(74) *Attorney, Agent, or Firm* — Browdy and Neimark, PLLC

(57) ABSTRACT

A method is provided for providing secured mobile IP services to a mobile terminal which is currently associated with an access network different from its own home access network. The method is characterized by creating a virtual mobile node at an access network server of the current access network, which communicates with a Home Agent associated with the terminal's home mobile network and with one or more access points associated with the current access network, at which the mobile terminal is currently located.

5 Claims, 4 Drawing Sheets

METHOD AND APPARATUS FOR ENABLING MOBILITY IN MOBILE IP BASED WIRELESS COMMUNICATION SYSTEMS

FIELD OF THE INVENTION

The present invention relates to wireless communications and, in particular, to the provisioning of mobility in mobile IP based wireless communications systems.

BACKGROUND OF THE INVENTION

Mobile IP is a protocol designed to allow mobile units, e.g. laptop computers, to roam between various sub-networks at various locations, while still maintaining Internet and/or WAN connectivity. This protocol was suggested by the IETF (Internet Engineering Task Force) and is described in a series of RFC (Request for Comment) documents. In order to further discuss this type of operation, let us first explain the three basic functional entities associated with Mobile IP networks.
Mobile Terminal. A host (e.g. a laptop computer) or router that changes its point of connection from one network or subnet, to another. A mobile terminal may change its location without changing its IP address; it may continue to communicate with other Internet nodes at any location using its (fixed) IP address, as long as the link-layer connectivity to a point of connection is available.
Home Agent. A router located at the mobile terminal's native network, which tunnels datagrams for delivery to the mobile terminal while roaming from its primary location (e.g. when away from home), and maintains information about the roaming mobile terminal current location.
Foreign Agent. A router located at a network (or sub-network) currently visited by the roaming mobile terminal (foreign network), and which provides, upon registration of the mobile terminal at the foreign network, routing services to the mobile terminal. The foreign agent is capable of tunneling and delivering datagrams to the mobile terminal that were tunneled by the mobile terminal's home agent. In case of datagrams sent by a mobile terminal, the foreign agent may serve as a default router for forwarding such datagrams to any registered mobile terminal, as required.

Such Mobile IP or related protocol, is directed to allow mobile terminals to stay connected while roaming through various networks and sub-networks. An implementation of Mobile IP is described for example in RFC 3344 of the IP Routing for Wireless/Mobile Hosts (Mobile IP) by which a mobile terminal is given a long-term IP address on its native (home) network. This native address is administered in the same way as a "permanent" IP address would be provided to a stationary host. When away from its native network, a "care-of address" is associated with the mobile node and reflects the mobile terminal's current point of connection. The mobile terminal uses its native address as the source address for all IP datagrams that are sent thereby, except for datagrams that are sent for the purpose of maintaining certain mobility management functions.

The following procedure is used to provide some brief demonstration of operation in accordance with the basic Mobile IP protocol.

Mobility agents (both foreign agents and home agents) advertise their presence via pre-defined Agent Advertisement messages. A mobile node may optionally solicit generation of an Agent Advertisement message from any locally connected mobility agent through an Agent Solicitation message. The mobile node receiving these Agent Advertisements determines therefrom whether it is currently located at its native network or at a foreign network. If the mobile node detects that it is located at its native network, it will operate without requiring receipt of the network mobility services.

Upon returning of the mobile node to its native network after being registered elsewhere, the mobile node will re-register with its home agent through exchanging of a Registration Request and Registration Reply messages with its home agent. Such Registration Messages must carry Mobile-Home Authentication extensions and may also carry Mobile-Foreign Authentication extensions.

However, when a mobile node detects that it has moved to a foreign network, it obtains a care-of address associated with the foreign network. The care-of address can either be determined from a foreign agent's advertisements (a foreign agent care-of address), or by some external assignment mechanism such as DHCP (a co-located care-of address).

The mobile node operating away from its native network would then register its new care-of address with its home agent through exchange of a Registration Request and Registration Reply messages therewith, possibly via a foreign agent. Datagrams that are thereafter sent to the mobile node's native address would be intercepted by its home agent and tunneled to the mobile node's care-of address. They will then be received at the tunnel endpoint (either at a foreign agent or at the mobile node itself), and delivered to the mobile node. In the reverse direction, datagrams sent by the mobile node are generally delivered to their destination using standard IP routing mechanisms, not necessarily passing through the home agent.

Another problem associated with the use of such mobile IP protocol, is the problem of securing transmissions to/from the mobile node.

RFC 2977 describes an Access Authentication and Authorization ("AAA") scheme, which might be used in case of a node currently located in a foreign network. In this RFC, the notion of the Local AAA Server has been introduced which relates to a server that is part of the network currently visited by that node, as opposed to the home AAA server, which is part of the node's native network. As shown in FIG. 1, the AAA process is partially carried out at the visited network, where the foreign agent is responsible to authenticate and authorize the user, and partially at the node's native network, where the home agent is responsible to carry out the AAA process. As will be understood by those skilled in the art, these two parts of the AAA process cannot be carried independently of each other, and there is also some exchange of information involved between these two AAA servers. However, the solution provided by this RFC does not disclose how to implement an AAA process when the node is a mobile IP node.

A number of attempts were made in the past in order to improve the options provided for users of the Mobile IP protocol.

U.S. Pat. No. 6,621,810 describes methods and apparatus for enabling intra-agent mobility by a mobile node, which permit a mobile node to register with a Home Agent via a Foreign Agent where the Home Agent and the Foreign Agent are provided in the same router.

U.S. Pat. No. 6,636,498 describes certain methods for implementing a mobile router are provided. By this patent, the Home Agent receives a registration request packet that includes a care-of address for the mobile router. Networks associated with the mobile router are then identified and the Home Agent then updates a routing table to associate the identified networks with the care-of address. In addition, the Home Agent updates a mobility binding table with the care-of address for the mobile router.

U.S. Pat. No. 6,501,746 describes methods for assigning an IP address to a mobile node during registration. The registration request is sent by a mobile node and the mobile node ID associated with the mobile node is obtained. A registration request packet which comprises the mobile node ID is then composed and sent to a Home Agent associated with the mobile node.

U.S. Pat. No. 6,760,444 relates to methods for authenticating a mobile node, by configuring a server to provide a number of security associations associated with a number of mobile nodes. A packet identifying a mobile node is sent to the server from a network device such as a Home Agent and a security association for the mobile node identified in the packet is then obtained from the server. The security association is sent to the network device to permit authentication of the mobile node. Alternatively, authentication of the mobile node may be performed at the server by applying the security association.

U.S. Pat. Nos. 6,466,964 and 6,795,857 disclose methods and devices to enable a node that does not support Mobile IP to roam to various Foreign Agents, thus allowing such node to receive packets that are sent thereto by another node. This is functionality is accomplished, in part, through enabling a Foreign Agent to independently perform registration on behalf of that node. In addition, a Home Agent associated with the node, independently performs de-registration on behalf of the node when the node roams to a Foreign Agent from the Home Agent or from a Foreign Agent to another Foreign Agent. This is achieved without any communication from the node to indicate its wish to register or de-register. Moreover, because the node is not capable of implementing the Mobile IP protocol, the solution provided is to implement a virtual Foreign Agent that will allow the node to appear as if it sends a packet to only one Foreign Agent rather than to different Foreign Agents each time the node roams to a new Foreign Agent, and that the node is sending and receiving packets through only one router (e.g., Foreign Agent) that is the default gateway. The method disclosed by U.S. Pat. Nos. 6,466,964 and 6,795,857 teaches the use of a virtual Foreign Agent in a network having a plurality of Foreign Agents. By this method, a single dummy interface IP address is associated with an interface of each one of the Foreign Agents, thereby facilitating communication between the node and one of the Foreign Agents via the dummy interface IP address.

US 20050025091 discloses methods and apparatus for providing a centralized source of session keys to be shared by a Home Agent and a Mobile Node. By this application, a mobile node registers with a Home Agent supporting mobile IP by sending a registration request to the Home Agent. The Home Agent sends a request message to a AAA server identifying the mobile node. The AAA server then derives key information from a key or password associated with the mobile node and sends a reply message to the Home Agent, the reply message including the key information associated with the mobile node, which in return enables the Home Agent to derive a shared key to be shared between the Mobile Node and the Home Agent from the key information. The Home Agent derives a key from the key information, and the key is a shared key between the mobile node and the Home Agent. A registration reply is then sent to the mobile node, which in indicates that the mobile node may derive a key to be shared between the mobile node and the Home Agent. The mobile node then derives a key to be shared between the mobile node and the Home Agent from key information stored at the mobile node.

US 20040213260 describes methods that enable proxy mobile IP registration to be performed in a secured manner. By this disclosure, various security mechanisms are used independently, or in combination with one another, to authenticate the identity of a node during the registration process.

US 20040202126 describes methods for distributing a Mobile IP registration request to one of a number of Home Agents received from a Foreign Agent to which the mobile node has roamed. The source IP address of the registration request is the IP address of the Foreign Agent to which the mobile node has roamed, so that the selected Home Agent sends a mobile IP registration reply directly to the Foreign Agent without interception by the network device.

However, none of the methods disclosed in the prior art has proposed a solution to the problem of how to enable IP mobility in a multi-operator environment, in a properly secured way.

The disclosure of the references mentioned throughout the present specification are hereby incorporated herein by reference in their entireties and for all purposes.

SUMMARY OF THE INVENTION

It is an object of the present invention to provide a method and apparatus to of providing Mobile IP based network mobility to mobile terminals that are based on mobility aware layer 2 technology preferably without requiring any Mobile IP client software to be installed in the mobile terminals.

It is another object of the present invention to provide a method and an apparatus that allow IP mobility for nodes that do not support Mobile IP, without violating common security models and trust relationship in a multi-operator environment.

Other objects of the invention will become apparent as the description of the invention proceeds.

According to an embodiment of the present invention, a mobile terminal (e.g. a mobile Customer Premises Equipment, "CPE") is authenticated by the Home Network and thereafter, a logical function in the Foreign Network is made aware of the successful completion of that authentication process, and keeps security authentication key (similar to Mobile Subscriber Station ("MSS") and network security credentials). The mobile IP ("MIP") Registration Request might be constructed only by the Network Access Server ("NAS") which has participated in the initial authentication process carried out between the mobile terminal and the Home Network and which is located in the access foreign network. The NAS will simulate MIP Mobile Node ("MN") behavior and will use a security key derived from the security authentication key already available in the NAS for an MN-Home Agent authentication extension.

According to a preferred embodiment of the present invention, there is provided in a mobile IP network, comprising an access network with which a mobile terminal is currently associated (wherein the access network is other than a native access network of that mobile terminal), a first mobile network associated with the access network and provide mobile services therefore (visited mobile network) and a second mobile network that is a native mobile network of that mobile terminal (home mobile network), a method for providing secured mobile IP services to the mobile terminal, wherein the method is characterized by creating a virtual mobile node at a Network Access Server ("NAS") associated with the access network, and wherein the virtual mobile node is operative to communicate with at least one Home Agent associated with the mobile terminal's home mobile network and with one or more access points associated with the access network.

Preferably, the method comprises the steps of:

initiating a request for receiving IP services by the mobile terminal;

initiating an authentication process carried between the mobile terminal and an access authentication and authorization server associated with the home mobile network;

upon completing successfully the authenticating process, creating a virtual mobile node entity on behalf of the authenticated mobile node;

sending a Registration Request to an access point associated with the mobile terminal;

at that access point, processing the Registration Request and forwarding it to the at least one Home Agent (either the original Registration Request, the processed Registration Request, or an indication thereof);

sending a Registration Reply by the Home Agent to the virtual mobile node;

at the network access server, allowing traffic transmitted to and received from the mobile terminal, to pass via the selected access point.

According to yet another preferred embodiment of the present invention, the method provided further comprises allowing the mobile terminal to move to an area served by another access point associated with that same access network and to conduct mobile IP sessions through that other access point, without repeating the full authentication process as was conducted when the mobile terminal has been registered for the first time in that access network. As will be appreciated by those skilled in the art, the term "first time" refers to the first occasion where the mobile terminal has initiated a request to receive IP services at that access network. Naturally, if the mobile terminal leaves the access network or disconnect therefrom, the next time its user would require receiving IP services again through this access network, the authentication process will have to be carried in full, as if this was the first time for that mobile terminal to connect to this access network.

According to still another embodiment of the present invention, the method provided comprises the steps of:

carrying out an authentication process for the mobile terminal;

at the network access server, creating the virtual mobile node entity;

having the mobile terminal moved to an area served by another access point associated with that access network;

at the access network management, selecting a second access point to be associated with the mobile terminal currently located in the new area and communicating this information to the network access server;

at the network access server, sending a Registration Request to the second access point;

at the second access point, sending a Registration Request to the Home Agent;

sending a registration Reply from the Home Agent to the virtual mobile node;

forwarding the Registration Reply to the second access point;

at the network access server, allowing traffic transmitted to and received from the mobile terminal, to pass via said second selected access point.

The step of selecting a second access point to be associated with the mobile terminal currently located in the new area should be understood to encompass both cases where the second access point is either the same as the other access point serving the area to which the mobile terminal has moved and with which it established the renewed communication, or a different access point, still associated with the same access network.

The term "access point" as used herein is used to denote either an access point or a Foreign Agent as the case may be, preferably the access point is operative is a manner similar to that of MIP Foreign Agent. Still preferably, when a foreign agent is used, the registration request from the NAS to that foreign agent is routed so as it would arrive at the same interface through which the mobile terminal's data traffic arrives.

DETAILED DESCRIPTION OF THE INVENTION

A better understanding of the present invention is obtained when the following non-limiting detailed description.

Figure 1:
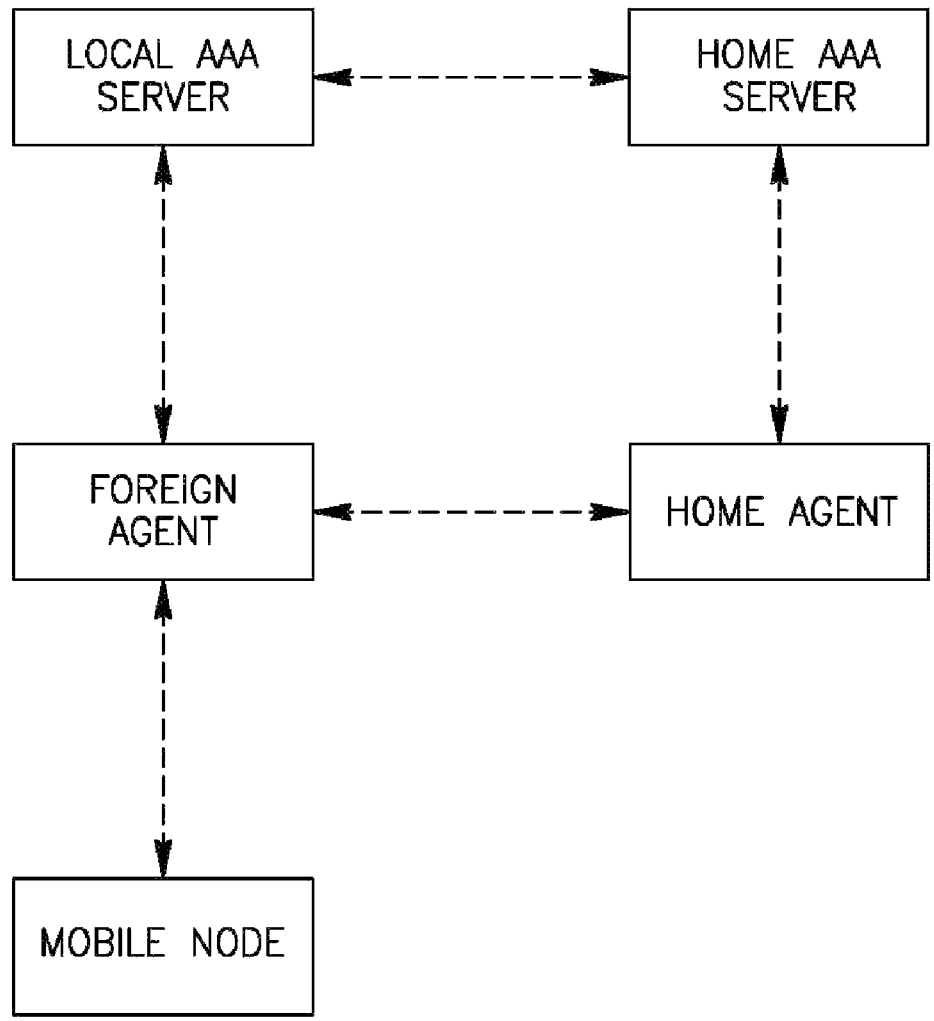
FIG. 1—presents a prior art schematic illustration of a general AAA scheme.
Figure 2:
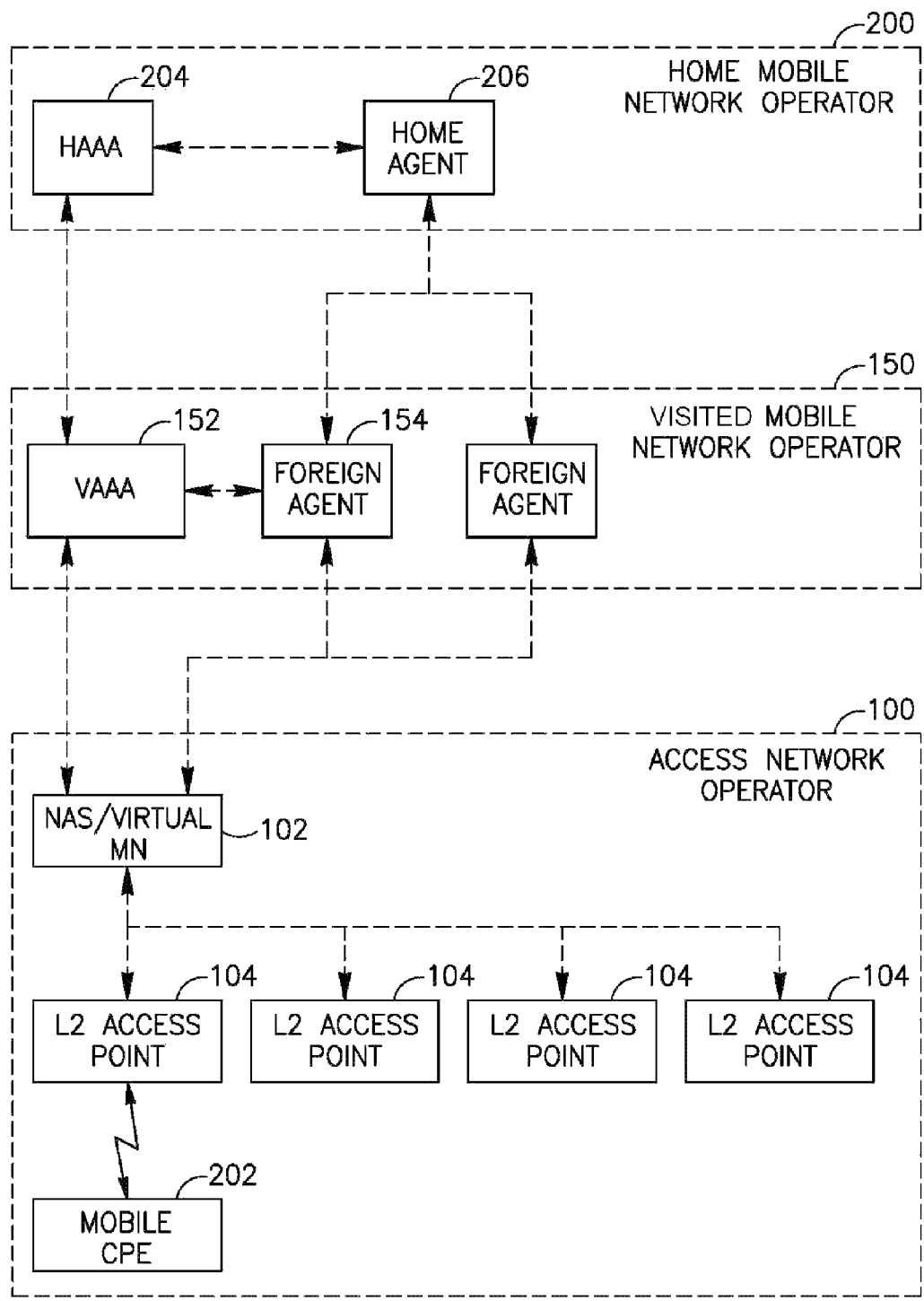
FIG. 2 presents a schematic block diagram of a network operative in accordance with the present invention.

Let us first consider an example of a multi-operator environment as illustrated in FIG. 2. By this example, the L2 access network 100 is operated by a certain business entity referred to as "Access Network Operator", the visited core mobile network 150 is operated by another business entity referred to as "Visited Mobile Network Operator" and the home core mobile network 200 is operated by yet another business entity referred to as "Home Mobile Network Operator".

Now, assuming that a user of mobile CPE 202 whose native mobile network is the home mobile network 200, is interested in establishing IP connection through access network 100 at which he is currently located. The request for establishing such an IP connection will be made through any one of the L2 Access Points 104 associated with access network 100. Typically, in order to allow network access for a mobile CPE 202, the operator of access network 100 would deploy some network authentication mechanisms, which would run between the mobile CPE and the appropriate authentication authority, e.g. via the L2 network entry and authentication signaling means. In the present case, where the Access Network Operator and Home Mobile Network Operator are different business entities, the authentication authority 204 resides in the home core mobile network 200, and is adapted to deliver the authentication results to an access control entity 102 located in access network 100. An example of such authentication mechanism might be an Extensible Authentication Protocol "EAP" model, which will be used to define the following entities: authentication client (e.g. Supplicant), the Home Authentication Server ("H-AAA") (204) and Authenticator/NAS (102). Supplicant and H-AAA server (204) will carry out an authentication procedure as known in the art per se (e.g., by communicating with Home Agent 206). Upon successful completion of the authentication procedure, security keys are derived at both ends —at Supplicant and at H-AAA. H-AAA then delivers the results of the authentication procedure and the derived security key(s) to the NAS. NAS 102 procedure, security keys are derived at both ends—at terminates the L2 Network Entry and allows/prohibits mobile CPE 202 to enter the network according to the decision of the H-AAA server. NAS 102 is also responsible for further securing the communications with mobile CPE 202 at lower layer (i.e. L2).

The communications between NAS 102 and H-AAA server 204 are done via the Visited AAA Server ("V-AAA") 152, which is adapted to forward the AAA messages to the relevant H-AAA 204 but without being aware of the content of the messages being exchanged (the EAP communications). This way the user credentials are exchanged between Mobile CPE 202 and H-AAA 204 and authentication keys are provided at both ends. The security key derived from the primary authentication key is delivered to NAS 102 but naturally is not yet recognized by V-AAA 152 and not by Foreign Agent 154 in the visited core mobile network 150 nor by access points 104 in access network 100.

However, access network 100 may comprise a plurality of access points. According to a preferred embodiment of the present invention, the mobility of the Mobile CPE between such access points is allowed, but without having to carry out a full Re-Authentication between Mobile CPE 202 when communicating through a different access point, and the H-AAA 204 of the native network 200. Furthermore, it is also preferred that the credentials and the authentication keys known to the NAS, shall not be delivered to any other node neither in the access network nor in the visited core mobile network, in order to maintain an adequate security framework.

In view of the above, the access point is not provided with the capability to construct the Proxy MIP ("PMIP") Registration Request on behalf of Mobile CPE 202.

To overcome this problem, once Mobile CPE 202 has been authenticated by its home network 200, a logical function is provided at access network 100, which is made aware of the successful authentication decision and retains the security authentication key.

Figure 3:
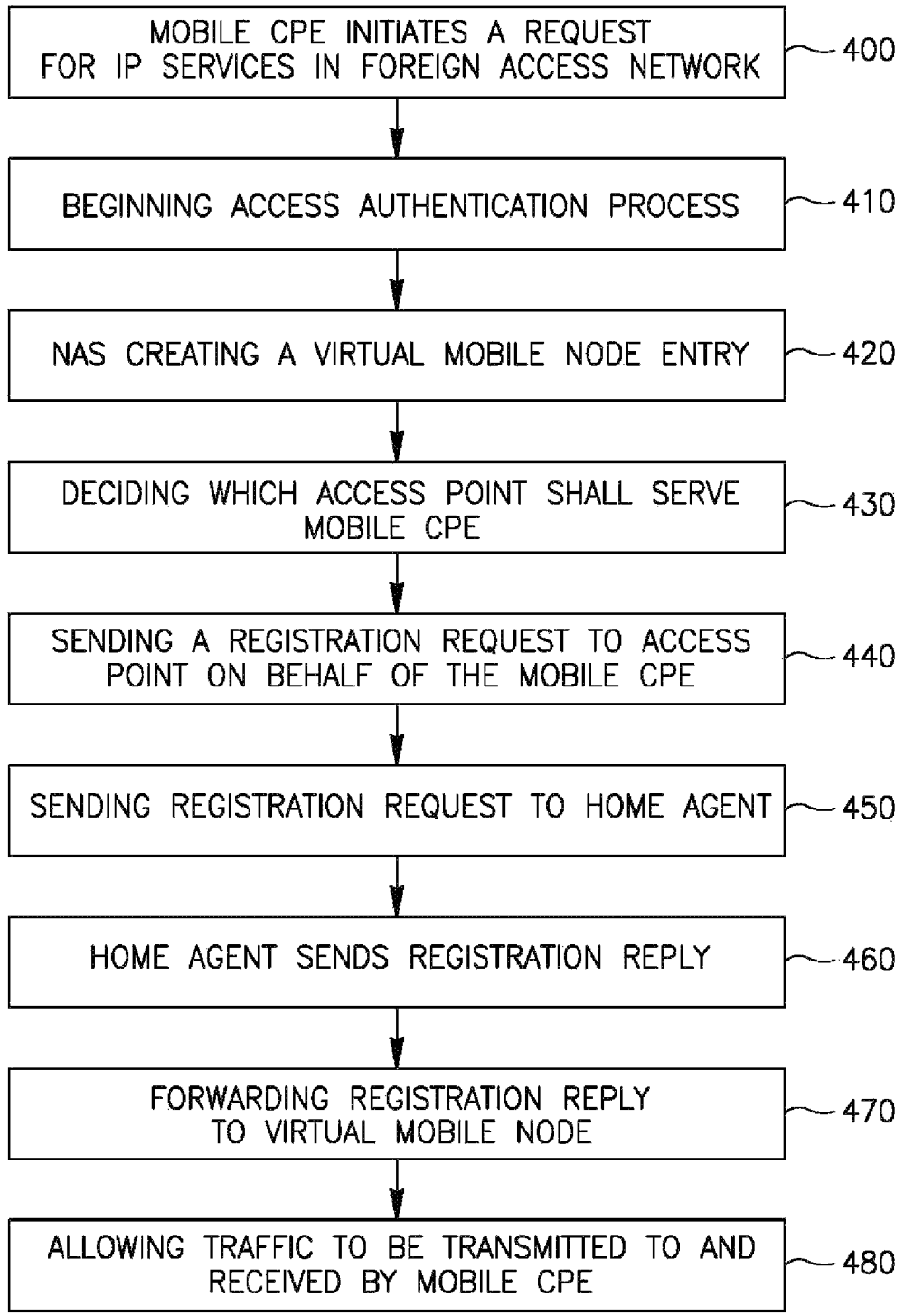
FIG. 3 illustrates a block diagram of a method for carrying out the initial network entry authentication according to an embodiment of the present invention.

From that point on, any MIP Registration Request initiated while mobile CPE 202 is associated with access network 100, will be constructed only by the same NAS 102 that has participated in the initial Mobile CPE-to-Network authentication process. NAS 102 will simulate MIP MN behavior and will use the security key derived from the security authentication key already available in the NAS for an MN-HA authentication extension for any other access point. FIG. 3 illustrates a block diagram exemplifying a method for carrying out the initial network entry authentication.

The mobile CPE starts communicating with one of the access points associated with the relevant access network (step 400) and initiates a request for receiving IP services. In response to that request, a L2 access authentication process begins (step 410) between the Mobile CPE and H-AAA with the assistance of the NAS associated with the relevant access network, while the communications are routed via the V-AAA of visited mobile network. Upon completing the authenticating process, the NAS creates (step 420) a virtual mobile node entity on behalf of the authenticated mobile CPE. The NAS then decides (step 430) which access point will be selected for the Mobile CPE and sends (step 440) a Registration Request to the access point on behalf of the Mobile CPE. The Registration Request may be formatted in any acceptable way known in the art, preferably as specified in RFC 3344.

The access point processes the Registration Request and sends it to the Home Agent (step 450). The Home Agent preferably operates as specified in RFC 3344, and the access point and the HA may communicate with the V-AAA and H-AAA respectively, in accordance with the methods described in RFC 2977.

The HA responds to the virtual mobile node created in step 420 with a Registration Reply (step 460), and thereafter, the access point processes Registration Reply and forwards it to the virtual mobile node (step 470). Upon completing the L2 network entry process, the NAS allows traffic associated with the Mobile CPE to pass via the corresponding L2 Access Point and/or the Foreign Agent (step 480).

Figure 4:
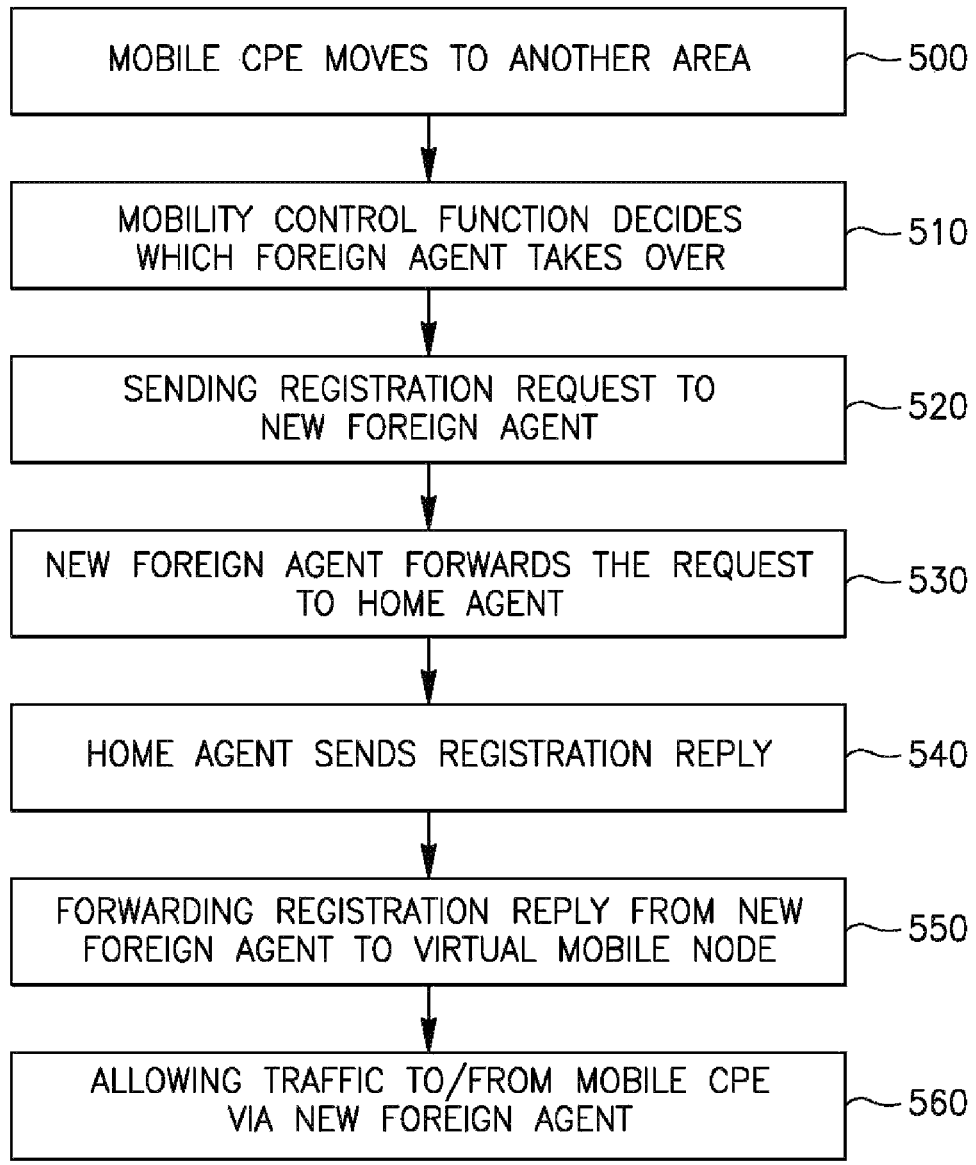
FIG. 4 illustrates a block diagram of a method for allowing the mobility of a mobile terminal within an access network according to an embodiment of the present invention.

FIG. 4 illustrates a block diagram of a method for allowing the mobility of a mobile terminal within an access network according to an embodiment of the present invention.

Let us consider a case that the mobile CPE has already been authenticated at the access network in which it is currently located. Then, the mobile CPE moves to an area served by another FA associated with the same access network (step 500).

The mobility control function associated with the access network decides which other FA should be chosen for the mobile CPE, and communicates its decision to the NAS (step 510). The NAS then sends a Registration Request to the chosen FA on behalf of the mobile CPE (step 520). The FA processes the Registration Request and sends it to the HA (step 530). In return, the HA responds to the virtual mobile node (located in the NAS) with Registration Reply (step 540). The Registration Reply is then forwarded to the chosen FA, processed and sent to the virtual mobile node (step 550). Thereafter, the NAS allows the traffic associated with the mobile CPE to pass via the newly chosen FA (step 560).

As will be appreciate by those skilled in the art, the mobility of mobile terminals in mobile IP based network that are based on mobility aware layer 2 technology, is thus achieved without requiring any dedicated mobile IP client software to be installed in the mobile terminals.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. In a mobile IP network, comprising an access network with which a mobile terminal is currently associated and wherein said access network is other than a native IP network of said mobile terminal, a first mobile network associated with said access network and operative to provide mobile services therefore and a second mobile network that is a native IP network of said mobile terminal, a method for providing secured mobile IP services to said mobile terminal, said method comprising creating a virtual mobile node representing said mobile terminal and associated with said access network, wherein said virtual mobile node is operative to communicate with at least one Home Agent associated with said second mobile network and to retain a first security authentication key for enabling secured communications between said virtual mobile node and said second mobile network;

wherein said virtual mobile node is located separately from a network access server associated with said access network and operative to participate in an initial authentication to be carried when said mobile terminal is authenticated by said second mobile network, wherein said network access server is adapted to use a second security authentication key derived from a security authentication key already available at the network access server, to enable exchange of secured communications between said access network and said mobile terminal, and wherein said network access server is operative to enable said virtual mobile node to apply the first security authentication key, said method comprising the steps of:

initiating a request for receiving services by said mobile terminal;

initiating an authentication process carried between said mobile terminal and an access authentication and authorization server associated with said second mobile network;

upon completing successfully the authenticating process, instigating a virtual mobile node entity which represents said mobile terminal and is associated with said access network on behalf of the authenticated mobile terminal;

sending a protected registration request message to said at least one Home Agent, wherein said Registration Request message is protected by using said first security authentication key;

sending a protected registration reply message by said at least one Home Agent to said virtual mobile node wherein said registration reply message is protected by using said first security authentication key;

at the access network, allowing traffic transmitted to and received from said mobile terminal, to pass via a selected access point and/or a Foreign Agent located in said access network.

2. The method according to claim 1 which further comprises allowing said mobile terminal to move from its current location to a new area served by another access point and to conduct a mobile IP session through a second access point without repeating a full authentication process conducted when said mobile terminal has been registered for a first time in the said access network; and wherein said method comprising the steps of:

upon moving of said mobile terminal to said new area served by another access point, selecting said second access point to be associated with said mobile terminal currently located in the new area and communicating this information to said network access server while using said second security authentication key to conduct a secured association between said mobile terminal and the second access point;

at said virtual mobile node, sending the protected registration request message to said Home Agent located at the second mobile network, wherein said registration request message is protected by using the security authentication key to secure this communication;

sending the protected registration reply message from said Home Agent to said virtual mobile node;

at the access network, allowing traffic transmitted to and received from said mobile terminal, to pass via said selected second access point.

3. The method according to claim 1, wherein at least two networks from among the access network, a visited mobile network and a home mobile network, are operated by different business entities.

4. The method according to claim 2, wherein the traffic transmitted to and received from said mobile terminal, is allowed to pass via said selected second access point and another Foreign Agent.

5. The method according to claim 4, wherein said virtual mobile node is located at said other Foreign Agent.

* * * * *